Jan. 1, 1957 T. L. SMITH 2,776,153
ARMORED GASKET FOR PIPE REPAIR CLAMP AND THE LIKE
Original Filed Jan. 26, 1948

INVENTOR.
TELFORD L. SMITH
BY
ATTORNEY

United States Patent Office

2,776,153
Patented Jan. 1, 1957

2,776,153

ARMORED GASKET FOR PIPE REPAIR CLAMP AND THE LIKE

Telford L. Smith, South San Franciso, Calif.

Original application January 26, 1948, Serial No. 4,317, now Patent No. 2,690,193, dated September 28, 1954. Divided and this application March 4, 1954, Serial No. 414,212

6 Claims. (Cl. 288—2)

This invention relates to an improved gasket for use in pipe repair clamps and the like. This application is a division of application S. N. 4,317, filed January 26, 1948, now U. S. Patent No. 2,690,193.

The gasket of this invention solves problems in connection with the repair clamp field. It may be used with the clamp claimed in the above identified parent application or it may be used with other types of repair clamps, such as the malleable band type. Such clamps are used customarily to repair a minor break in a pipe rather than replacing an old section of otherwise good pipe. In that way, leaks and breaks in cast iron water mains and other parts of soil pipe may be inexpensively repaired.

One of the problems solved by the present invention arises because the meeting ends of pipe clamp sleeves or bands tend to dig in to the gasket. As the metal digs into the gasket, it tends to destroy the gasket or to damage it so severely that it cannot be safely used. The present invention solves this problem by providing an armored gasket, that is, a rubber gasket member provided with a longitudinal recess in which a strip of malleable metal is cemented. The metal lies substantially flush with the back face of the gasket, and it does not interfere at all with the front face of the gasket which seals around the pipe. The armored strip on the backside adequately protects the rubber from the pinching or biting or chewing action of the clamp.

Another problem solved by the present invention is that of obtaining a tight seal around the pipe. This has been accomplished partly by providing a grid work on the face of the gasket against the pipe and by tapering the ends of the gasket so that two gasket halves or two ends of one gasket can be joined together with overlap and without changing the net thickness of the gasket. To this structure, the present invention adds the armoring strip which serves to distribute the clamp pressure evenly about the usually troublesome area near where the clamp ends meet.

Other objects and advantages of the invention will appear from the following description of a preferred embodiment thereof.

Figure 1:
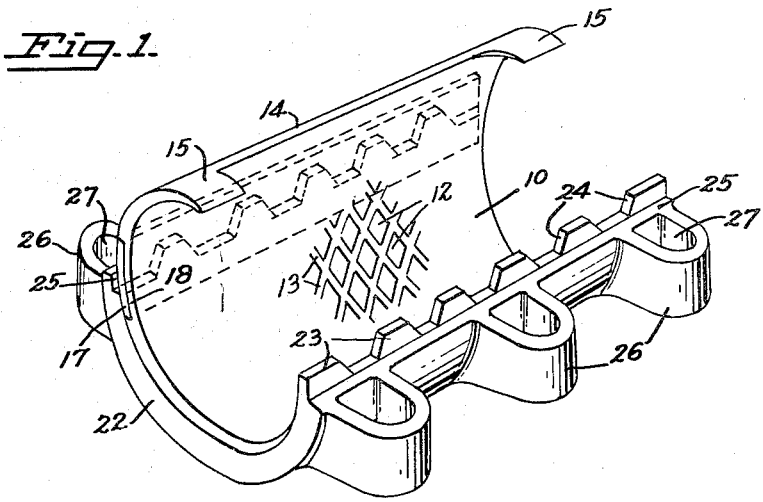
Fig. 1 is a view in perspective showing a resilient gasket embodying the principles of my invention and incorporating a protecting guard strip of malleable metal, the gasket being shown cemented into a pipe clamp section.
Figure 4:
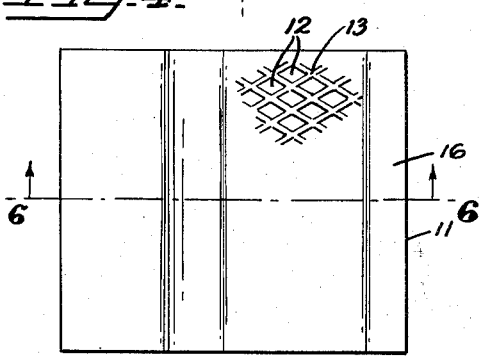
Fig. 4 is a top plan view of a somewhat modified form of the gasket.
Figure 5:
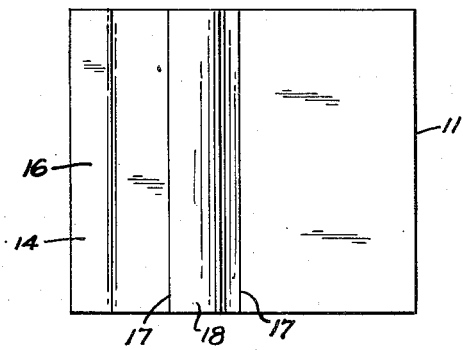
Fig. 5 is a bottom plan view of the gasket of Fig. 4.

Two forms of the novel gasket of my invention are shown in the drawings. Each gasket 10 (Fig. 1) or 11 (Figs. 4–5) is preferably made of treaded rubber or rubber-like material. Various tread patterns may be used, but the one shown in Figs. 1 and 4 has been found to be very satisfactory. It consists of a lattice work design with pockets 12 depressed below the level of the ribbed surface 13 which faces and seals against the pipe. The rear face 14 of the gasket 10 or 11 preferably has a smooth surface, so that it is well adapted to be cemented into a pipe clamp section like the section 22 shown in the drawings. Each gasket 10 is preferably tapered or skived at its ends 15 so that when the gasket 10 is installed and the ends 15 overlap, the overall thickness at the overlapped portion will be substantially the same as the thickness of either gasket 10, and thereby the entire thickness is substantially uniform. The same thing is true of the tapered ends 16 of the gasket 11.

Figure 6:
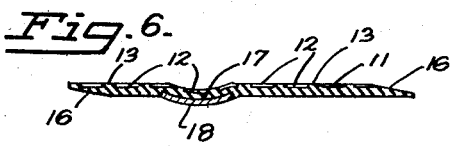
Fig. 6 is a view in section taken along the line 6—6 in Fig. 4.

In the rear face 14 of the gasket 10 or 11 a recess 17 is provided, preferably generally rectangular in shape, and in this recess 17 a strip 18 made from copper or some other metal more malleable than cast bronze is bonded. Cast bronze and iron are the metals normally used for pipe clamps of the sleeve type, and it is desired that the armorings be somewhat more malleable than the rigid clamp so that it can bend. The malleable-band type of clamp is held together by lugs, and the lugs are normally made from bronze or malleable iron; again, the strip 18 should be more malleable than the metal from which the lugs are made. Since the installed clamp will be cylindrical, it is normally desirable to have the armor strip 18 be somewhat curved along a small arc of a cylinder approximately corresponding to the size of the pipe for which the gasket 10 or 11 is designed (see Figs. 1 and 6). The size of the strip 18 depends upon the size of pipe clamp used because it is desirable to have the strip 18 large enough so that there can be no pinching of the gasket by the assembled clamp. Not only do the strips 18 keep the gasket 10 from being chewed by the clamp 20, but being malleable, they readily conform to the shape of the pipe 21 as the clamp 20 is tightened.

The strip 18 is bonded to the gasket 10 or 11, as by vulcanizing it thereto or cementing it thereto, or by first cementing it and then vulcanizing it.

By way of example, a pipe repair clamp 20 has been illustrated to show the operation of the gasket 10. The clamp 20 shown herein is the one claimed in application Serial No. 4,317 filed January 26, 1948, now U. S. Patent No. 2,690,193, though other types may be used with the same gasket 10 or 11. The clamp 20 comprises two half sections 22 with interlocking fingers 23 and receiving pockets 24. The fingers 23 extend out far enough so that when two sections 22 are placed together, the fingers 23 form a suitable guide as well as a fulcruming point for closing the clamp sections 22 about the pipe 21. A flange 25 also aids in this positioning and fulcruming the two sections together while they are being bolted together around the pipe. A plurality of lugs 26 on the outside of the clamp are provided with openings 27 large enough to receive bolts 28 loosely.

When the clamp section 22 comes from the factory, the gasket 10 (or 11) is normally cemented in place with the armored strip 18 adjacent where the rows of fingers 23 and pockets 24 meet.

Figure 2:
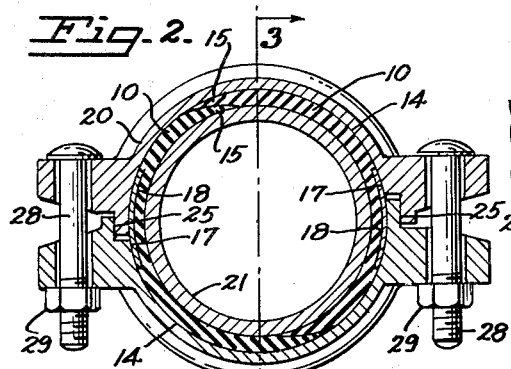
Fig. 2 is a view in elevation and in section taken along the line 2—2 of Fig. 3 except for the cut-away of parts of Fig. 3 showing a complete clamp installed around a pipe and incorporating two gaskets like the one shown in Fig. 1.
Figure 3:
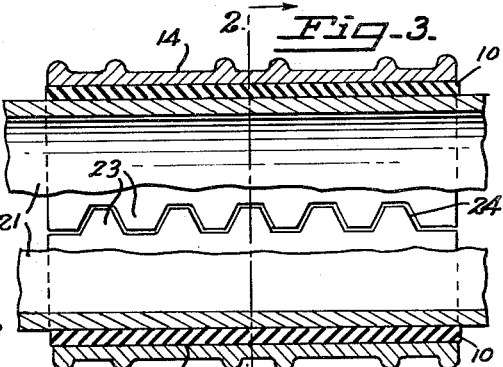
Fig. 3 is a view in section taken along the line 3—3 of Fig. 2, the gasket protecting means and the pipe being cut away in part in order to show a juncture of the clamp ends which might tend to chew into the gasket except for my novel armoring feature.

One of these sections 22 with its gasket 10 and protecting strip 18 may be placed on one side of the pipe 21 and another identical section 22 may be placed on the other side of the pipe 21. The bolts 28 are then inserted through the openings 27 in the lugs 26, and nuts 29 may be threaded on to them and tightened. This action tightens the clamp 20 until it finally assumes approximately the position shown in Fig. 2.

As the bolts 28 and nuts 29 are tightened and the two sections 22 are compressed together, the gasket 10 (or 11) is compressed against the pipe and, were it not for the armor strip 18, the fingers 23 would tend to dig into the gasket 10 (or 11) and damage it, but the armor strip 18 prevents this and merely causes the gasket 10 or 11 to be further compressed against the pipe. If the cylindrical arc of the strip 18 is not exactly that of the pipe 21, it will be conformed to it by this compressing action.

The armoring of the gasket thus preserves it and enables it to do a better sealing job, while the treading aids in the prevention of leakage from between the pipe 21 and the pipe clamp 20. The tapered ends 15 and 16 also aid in the sealing action by preventing any bulges or voids from occurring at the gasket ends and enabling overlap, so that there is no butt end which might permit leakage.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A leak sealing gasket for disposition between a leaking pipe and a jointed clamp, comprising a rectangular sheet of yieldable material, the sheet having opposed joint forming skived edges; the sheet being provided with a recess in one face thereof of substantial width and extending substantially throughout the length thereof intermediate said skived edges and parallel thereto and a metallic wear strip disposed within said recess and bonded to the walls thereof, said wear strip having its outer face flush with the outer face of said sheet.

2. A leak sealing gasket for disposition between a leaking pipe and a jointed clamp, comprising a generally rectangular sheet of yieldable material, the sheet having opposed joint-forming tapered edges; the sheet having a treaded inner face adapted to lie against a pipe and an outer face of substantial width and having a recess extending throughout the length thereof intermediate said tapered edges and parallel thereto and an arcuate armor band of malleable metal disposed within and filling said recess and bonded to the walls thereof, said band having its outer face flush with the outer face of said sheet.

3. A cylindrical leak sealing gasket for disposition between a leaking pipe and a jointed clamp, comprising a pair of semi-cylindrical elongated sheets of yieldable material, the sheets having diametrically opposed skived joint forming edges, the sheets being further provided with diametrically opposed relatively wide recesses in the outer faces thereof and extending throughout the lengths thereof intermediate said skived edges, and a malleable metal strip disposed within and filling each said recess and bonded to the walls thereof, said strips having their outer faces flush with the outer faces of said sheets.

4. A cylindrical leak sealing gasket for disposition between an outer wall of a leaking pipe and an inner wall of a pipe-repair clamp, comprising at least one axially elongated sheet of yieldable material, having tapered edges at each end extending parallel to the widthwise axis of the gasket, the sheet being further provided with a relatively wide recess in the outer face thereof extending substantially throughout the lengths thereof intermediate said edges and generally parallel thereto and to the widthwise axis of the gasket, and an arcuate malleable metal armor strip disposed within said recess and bonded to the walls thereof, said wear strip having its outer face flush with the outer face of said sheet.

5. A cylindrical leak-sealing gasket for disposition in a longitudinally joined pipe clamp between the outer wall of a pipe and the inner wall of said clamp, comprising a longitudinally divided clamp lining sleeve of yieldable material having a pair of opposed joint forming edges, said sleeve being further provided with a relatively wide recess in its outer wall extending throughout the length thereof between said joint forming edges and parallel to the axis of said pipe clamp, and a malleable metal armor strip disposed within said recess and bonded to the wall thereof, said strip having its outer face flush with said sleeve.

6. A cylindrical leak-sealing gasket for disposition in a longitudinally joined pipe clamp between the outer wall of a pipe and the inner wall of said clamp, comprising a longitudinally divided clamp lining sleeve of yieldable material having a plurality of circumferentially spaced pairs of opposed joint forming edges, said sleeve being further provided with a relatively wide recess in its outer wall extending throughout the length thereof between each pair of said joint forming edges and parallel to the axis of said pipe clamp, and a metallic clamp joint engageable wear strip disposed within each said recess and bonded to the wall thereof, said wear strip having its outer face flush with said sleeve.

References Cited in the file of this patent

UNITED STATES PATENTS

| Number | Name | Date |
|---|---|---|
| 629,315 | Dorticus | July 18, 1899 |
| 859,546 | Davidson | July 9, 1907 |
| 1,961,762 | Hinderliter | June 5, 1934 |
| 2,009,744 | Pfefferle | July 30, 1935 |
| 2,224,918 | Merrill | Dec. 17, 1940 |
| 2,375,869 | Price | May 15, 1945 |
| 2,473,046 | Adams | June 14, 1949 |
| 2,616,736 | Smith | Nov. 4, 1952 |
| 2,690,193 | Smith | Sept. 28, 1954 |